(12) United States Patent
Kwon et al.

(10) Patent No.: US 11,924,823 B2
(45) Date of Patent: Mar. 5, 2024

(54) MULTI-LINK DEVICE ASSOCIATION AND REASSOCIATION

(71) Applicant: NXP USA, Inc., Austin, TX (US)

(72) Inventors: Young Hoon Kwon, Laguna Niguel, CA (US); Liwen Chu, San Ramon, CA (US); Hongyuan Zhang, Fremont, CA (US); Huiling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 6 days.

(21) Appl. No.: 17/182,141

(22) Filed: Feb. 22, 2021

(65) Prior Publication Data

US 2021/0266931 A1 Aug. 26, 2021

Related U.S. Application Data

(60) Provisional application No. 62/980,173, filed on Feb. 22, 2020.

(51) Int. Cl.
*H04W 72/1263* (2023.01)
*H04W 60/00* (2009.01)
*H04W 72/0446* (2023.01)
*H04W 76/11* (2018.01)
*H04W 80/02* (2009.01)

(52) U.S. Cl.
CPC ..... *H04W 72/1263* (2013.01); *H04W 60/005* (2013.01); *H04W 72/0446* (2013.01); *H04W 76/11* (2018.02); *H04W 80/02* (2013.01)

(58) Field of Classification Search
CPC ......... H04W 72/1263; H04W 72/0446; H04W 76/11; H04W 60/005; H04W 80/02
USPC ........................................................ 370/329
See application file for complete search history.

(56) References Cited

U.S. PATENT DOCUMENTS

| 11,134,542 | B2 * | 9/2021 | Stacey | H04W 48/16 |
| 2021/0029588 | A1 * | 1/2021 | Cariou | H04W 28/0263 |
| 2021/0211234 | A1 * | 7/2021 | Kneckt | H04L 1/1841 |
| 2021/0400662 | A1 * | 12/2021 | Huang | H04B 1/48 |

OTHER PUBLICATIONS

Cisco Systems, Inc.; "Cisco Secure Services Client Administrator Guide, 5.1.1"; 164 pages (Nov. 11, 2013).
U.S. Appl. No. 17/138,801; 38 page (filed Dec. 30, 2020).
Wikipedia; IEEE 802; retreived from the internet—https://en.wikipedia.org/wiki/IEEE_802.11; 3 pages (Feb. 8, 2021).

(Continued)

*Primary Examiner* — Intekhaab A Siddiquee

(57) ABSTRACT

One example discloses a first-device: wherein the first-device is configured to be coupled to a second-device over an IEEE 802.11 communications link; and wherein the first-device is configured to, store a current setup between the first-device and the second-device; identify a unique identifier of the second-device; transmit a request frame to a third-device; wherein at least one of the second-device and third-device is a multi-link-device (MLD); wherein the request frame is configured to request an association with the third-device and includes the unique identifier of the second-device; receive a response frame from the third-device; and wherein the response frame includes an indication that request was successful.

28 Claims, 6 Drawing Sheets

(56) References Cited

OTHER PUBLICATIONS

Wikipedia; IEEE 802be; retreived from the internet https://en.wikipedia.org/wiki/IEEE_802.11be; 2 pages (Feb. 8, 2021).
IEEE; "P802.11 Wireless Lan—20/1935r11"; 329 pages (Jan. 2021)e.

* cited by examiner

TABLE 1 - REUSING REASSOCIATION FRAMES FOR BSS SWITCHING

| CURRENT AP-MLD | NEW AP-MLD | "CURRENT AP ADDRESS FIELD" IN REASSOCIATION REQ. FRAME | "STATUS CODE FIELD" IN REASSOCIATION RESP. FRAME |
|---|---|---|---|
| SINGLE-LINK | SINGLE-LINK | AP MAC ADDRESS | SUCCESS |
| SINGLE-LINK | MULTI-LINK | AP MAC ADDRESS | SUCCESS MULTI_LINK (NEWLY DEFINED) |
| MULTI-LINK | SINGLE-LINK | AP-MLD MAC ADDRESS | SUCCESS |
| MULTI-LINK | MULTI-LINK | AP-MLD MAC ADDRESS | SUCCESS MULTI_LINK (NEWLY DEFINED) |

TABLE 2 - NEW REASSOCIATION FRAMES FOR BSS SWITCHING

| CURRENT AP-MLD | NEW AP-MLD | FRAME EXCHANGE |
|---|---|---|
| SINGLE-LINK | SINGLE-LINK | REASSOCIATION REQUEST/RESPONSE |
| SINGLE-LINK | MULTI-LINK | MULTI-LINK RESETUP REQUEST/RESPONSE |
| MULTI-LINK | SINGLE-LINK | REASSOCIATION REQUEST/RESPONSE |
| MULTI-LINK | MULTI-LINK | MULTI-LINK RESETUP REQUEST/RESPONSE |

FIG. 3

TABLE 3 – REUSING REASSOCIATION FRAMES FOR NON-AP STA REASSOCIATION (E.G. ReSetup)

| CURRENT ASSOCIATION | NEW ASSOCIATION | "CURRENT AP ADDRESS FIELD" IN REASSOCIATION REQ. FRAME | "STATUS CODE FIELD" IN REASSOCIATION RESP. FRAME |
|---|---|---|---|
| SINGLE-LINK | MULTI-LINK | AP MAC ADDRESS | SUCCESS MULTI_LINK (NEWLY DEFINED) |
| MULTI-LINK | SINGLE-LINK | AP-MLD MAC ADDRESS | SUCCESS |

TABLE 4 – NEW REASSOCIATION FRAMES FOR NON-AP STA REASSOCIATION (E.G. ReSetup)

| CURRENT ASSOCIATION | NEW ASSOCIATION | FRAME EXCHANGE |
|---|---|---|
| SINGLE-LINK ASSOCIATION | MULTI-LINK SETUP | MULTI-LINK RESETUP REQUEST/RESPONSE |
| MULTI-LINK SETUP | SINGLE-LINK ASSOCIATION | REASSOCIATION REQUEST/RESPONSE |

FIG. 4

| TABLE 5 - REUSED ASSOCIATION REQUEST/RESPONSE FRAMES FOR NON-AP STA REASSOCIATION (I.E. Setup) | |
|---|---|
| NEW ASSOCIATION REQUEST | STATUS CODE FIELD IN ASSOCIATION RESP. FRAME |
| SINGLE-LINK | SUCCESS |
| MULTI-LINK | SUCCESS_MULTI_LINK (NEWLY DEFINED) |

FIG. 5

MULTI-LINK DEVICE ASSOCIATION AND REASSOCIATION

REFERENCE TO PROVISIONAL APPLICATION TO CLAIM PRIORITY

A priority date for this present U.S. patent application has been established by prior U.S. Provisional Patent Application, Ser. No. 62/980,172, entitled "Apparatus And Methods For (Re)Association In Multi-Link Communication Systems", filed on 22 Feb. 2020, and commonly assigned to NXP USA, Inc.

The present specification relates to systems, methods, apparatuses, devices, articles of manufacture and instructions for multi-link device association and reassociation within an IEEE 802.11 framework.

SUMMARY

According to an example embodiment, a first-device, comprising: wherein the first-device is configured to be coupled to a second-device over an IEEE 802.11 communications link; and wherein the first-device is configured to, store a current setup between the first-device and the second-device; identify a unique identifier of the second-device; transmit a request frame to a third-device; wherein at least one of the second-device and third-device is a multi-link-device (MLD); wherein the request frame is configured to request an association with the third-device and includes the unique identifier of the second-device; receive a response frame from the third-device; and wherein the response frame includes an indication that request was successful.

In another example embodiment, the third-device is an AP-MLD and the request is for a new multi-link setup with the third-device.

In another example embodiment, the third-device is a single-link-AP and the request is for a new single-link setup with the third-device.

In another example embodiment, the first-device is a non-AP MLD; and the second-device is an AP-MLD.

In another example embodiment, the unique identifier of the second-device is an MLD MAC address of the second-device if the second-device is an AP-MLD.

In another example embodiment, the unique identifier of the second-device is indicated by a current AP address field in the request frame.

In another example embodiment, the MLD MAC address of the second-device identifies an MLD management entity of the second-device.

In another example embodiment, the second-device is an AP-MLD and a set of single-link APs are affiliated with the second device; and the unique identifier of the second-device is a MAC address of at least one of the single-link-APs.

In another example embodiment, the request frame is based on a move of the first-device from the second-device to the third-device.

In another example embodiment, the request frame is based on a switch of a setup between the first-device and the second-device; and the third-device is an AP within the second-device.

In another example embodiment, the request frame is based on a switch of a setup from the first-device and the second-device to the first-device and the third-device.

In another example embodiment, the response frame includes an indication whether a single-link association or a multi-link association has been setup based on the request frame.

In another example embodiment, the single-link association or multi-link association indication is embedded in a status code field within the response frame.

In another example embodiment, except for the unique identifier, the request frame is same as a reassociation request frame between a non-AP single-link device and an AP single-link device.

In another example embodiment, the first-device is a logical non-AP-MLD with which a set of physical non-AP-STAs (stations) are affiliated; the second-device is a logical AP-MLD with which a set of physical APs are affiliated and having a set of communications links; the first-device is configured to have a current multi-link association with the second-device; at least one of the non-AP-STAs is configured to transmit a first management frame to the second-device requesting a new single-link association with one of the physical APs affiliated with the second-device; and the first management frame, includes a unique identifier identifying an address of the second-device with which the non-AP-STA is currently linked to; and includes an indication that the non-AP-STA intends to now associate with just one of the physical APs that are affiliated with the second-device on a preselected communications link within the set of communications links.

In another example embodiment, the first-device is configured to receive a second management frame from the second-device that includes an indication in a status code field that the non-AP-STA is now associated with the one of the physical APs on the preselected communications link.

In another example embodiment, after receiving the response frame from the third-device, a default TID-to-link mapping is applied between the first-device and the third-device.

In another example embodiment, the first-device is a non-AP-MLD, the second-device is a first-AP-MLD, and the third-device is a second-AP-MLD; and the first-device is further configured to, receive a request frame from the third-device that requests a specific Traffic Identifier (TID)-to-link mapping; and transmit a response frame to the third-device to indicate that the requested TID-to-link mapping is accepted.

In another example embodiment, the third-device is an AP-MLD including an affiliated set of communications links; and all of the affiliated communications links have been mapped to the TID by default.

In another example embodiment, after the first-device receives the response frame, the first-device is configured to transmit an additional IEEE 802.11 Traffic Identifier (TID) frame announcing a set of TID requirements; and the first-device is configured to receive an additional TID to communications link mapping frame from the third-device acknowledging that the set of TID requirements have been successfully implemented.

According to an example embodiment, a method of distributing instructions, stored on a non-transitory, tangible computer readable storage medium, for configuring first-device, wherein the instructions include: storing a current setup between the first-device and a second-device over an IEEE 802.11 communications link; identifying a unique identifier of the second-device; transmitting a request frame to a third-device; wherein at least one of the second-device and third-device is a multi-link-device (MLD); wherein the request frame is configured to request an association with the third-device and includes the unique identifier of the second-device; and receiving a response frame from the third-device; wherein the response frame includes an indication that the request was successful.

In another example embodiment, further comprising transmitting the instructions over a communications medium.

According to an example embodiment, a first-AP-MLD compliant with IEEE 802.11, comprising: wherein the first-AP-MLD is configured to receive a request frame from a non-AP-MLD; wherein the non-AP-MLD has previously stored, a current setup with a second-AP-MLD; and a unique identifier of the second-AP-MLD; wherein the request frame was configured to request an association with the first-AP-MLD and includes the unique identifier of the second-AP-MLD; transmit a response frame from the first-AP-MLD to the non-AP-MLD; and wherein the response frame includes an indication that request was successful.

In another example embodiment, the unique identifier of the second-AP-MLD is an MLD MAC address of the second-AP-MLD.

In another example embodiment, the unique identifier of the second-AP-MLD is indicated by a current AP address field in the request frame.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

BRIEF DESCRIPTION OF THE DRAWINGS

FIG. 3 shows Table 1 representing an example set of reused reassociation frames for BSS switching within the multi-link communications system, and Table 2 representing an example set of new reassociation frames for BSS switching within the multi-link communications system.

FIG. 4 shows Table 3 representing an example set of reused reassociation frames for non-AP-STA Reassociation (e.g. ReSetup) within the multi-link communications system, and Table 4 representing an example set of new reassociation frames for non-AP-STA Reassociation (e.g. ReSetup) within the multi-link communications system.

FIG. 5 shows Table 5 representing an example set of reused association request/response frames for non-AP-STA Association (i.e. Setup) within the multi-link communications system.

Figure 1:
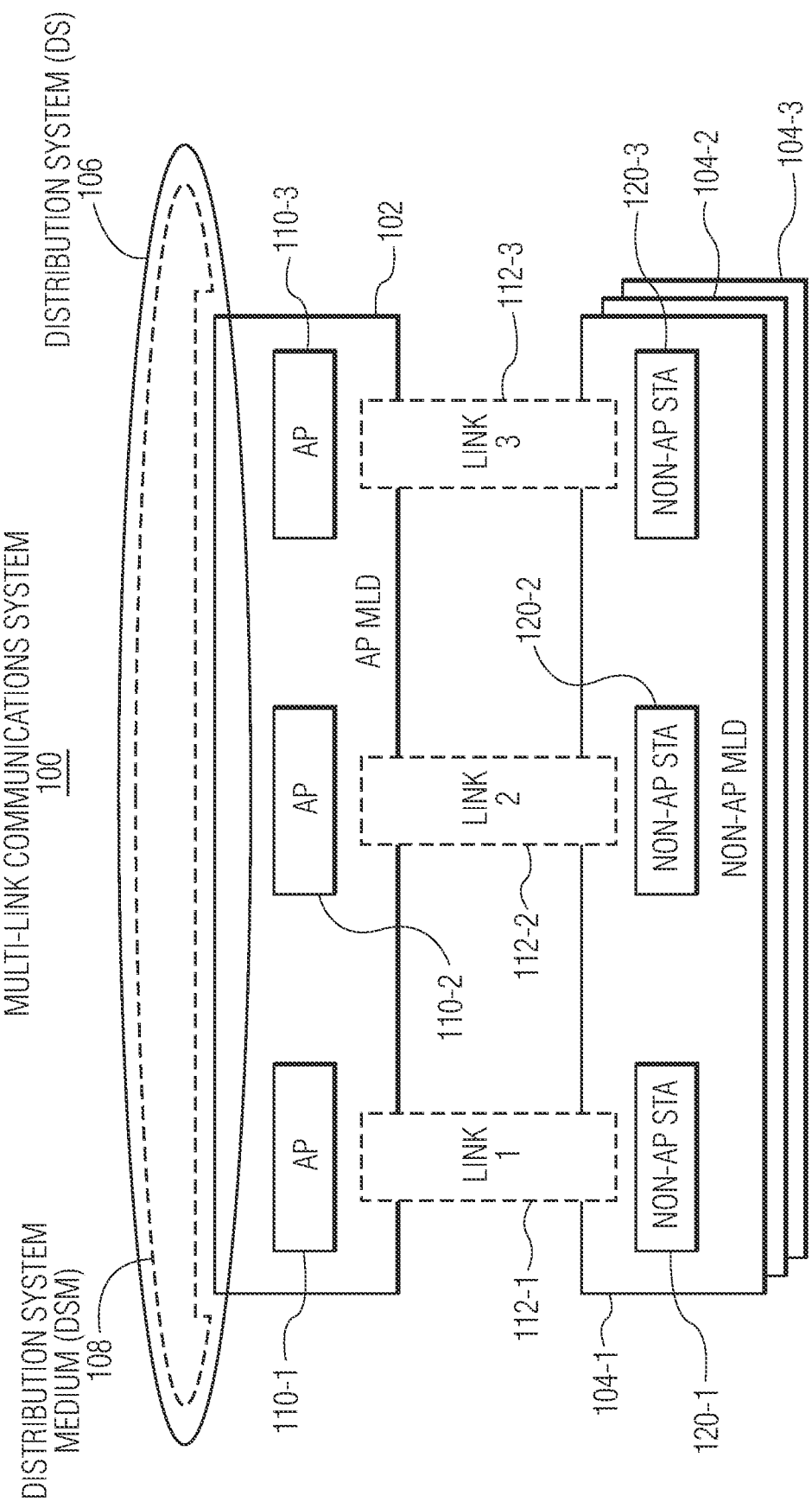
FIG. 1 represents an example multi-link communications system.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Wireless communications systems are useful in a variety of applications, including industrial, medical, computer network, edge, and home applications. These wireless communications systems, such as specified by the IEEE § 802.11.be protocol can include single-link or multi-link communications between various access points (APs) and-stations (STAs).

FIG. 1 represents an example multi-link communications system 100. The multi-link communications system 100 includes: at least one logical AP-MLD (Access Point Multi-Link Device) 102; a set of logical non-AP-MLDs 104-1, 104-2, 104-3; a distribution system (DS) 106; and a set of communications links 112-1, 112-2, 112-3. "Logical" is herein defined to include, for example, a set of physical devices abstractly aggregated into a single logical device for the purposes of communication and/or other functions.

For example, the logical AP-MLD 102 can include a set of physical APs (access points) 110-1, 110-2, 110-3. Similarly, the logical non-AP-MLDs 104-1 can include a set of physical non-AP-STA (stations) 120-1, 120-2, 120-3. The other non-AP-MLD 104-2, 104-3 may also include additional non-AP-STAs.

The AP-MLD 102 is coupled to a distribution system (DS) 106 through a distribution system medium (DSM) 108. The distribution system (DS) 106 is used to interconnect basic service sets (BSSs) and local area networks (LANs) to create an extended service set (ESS).

In IEEE 802.11 a service set (aka. extended service set (ESS)) is a group of wireless devices which are identified by a same SSID (service set identifier). A service set forms a logical network. A basic service set (BSS) is a subgroup of wireless devices within a service set operating with similar physical layer medium access characteristics (i.e. radio frequency, modulation scheme, security settings etc.) and that are wirelessly networked. Devices within basic service sets are identified by BSSIDs (basic service set identifiers).

The distribution system (DS) 106 may be a wired network or a wireless network that is connected to a backbone network such as the Internet. The DSM 108 may be a wired medium (e.g., Ethernet cables, telephone network cables, or fiber optic cables) or a wireless medium (e.g., infrared, broadcast radio, cellular radio, or microwaves).

The APs 110-1, 110-2, 110-3 may be implemented in hardware (e.g. circuits, IC, etc.), software, firmware, or a combination thereof. The APs 110-1, 110-2, 110-3 may include one or more antennas, transceivers, and controllers operably interconnected. The transceivers may include a physical layer (PHY) device. The controllers may be configured to process various data packets (e.g. PDUs, SDUs, etc.) received and/or to be transmitted. The APs 110-1, 110-2, 110-3 can be configured as either wired or wireless APs coupled to a LAN (local area network), a WLAN (wireless LAN) network, and/or a backbone network (e.g., the Internet). The AP-MLD 102 may also include a Media Access Control (MAC) data service interface, with associated MAC address that enables this device to communicate with the DSM 108.

Similarly, the non-AP-STAs 120-1, 120-2, 120-3 in the non-AP-MLDs 104-1 may be implemented in hardware (e.g. circuits, IC, etc.), software, firmware, or a combination thereof. The non-AP-STAs 120-1, 120-2, 120-3 may include one or more antennas, transceivers, and controllers operably interconnected. These transceivers may include a physical layer (PHY) device. The controllers may be configured to process various data packets (e.g. PDUs, SDUs, etc.) received and/or to be transmitted. Each of the non-AP-MLDs 104-2, 104-3 may also include non-AP-STAs (not shown).

The non-AP-MLDs 104-1, 104-2, 104-3 may also include a Media Access Control (MAC) data service interface, with associated MAC addresses that enable these devices to communicate with the DSM 108 over the communications links 112-1, 112-2, 112-3.

Example applications of the non-AP-STAs 120-1, 120-2, 120-3 include: laptop computers, tablet computers, desktop computers, mobile phones, edge devices, or other wireless devices.

In various example embodiments, one or more of the APs 110-1, 110-2, 110-3 and/or non-AP-STAs 120-1, 120-2, 120-3 may communicate over the links 112-1, 112-2, 112-3 in different frequency bands (e.g. 2.4 GHz, 5 GHz, 6 GHz, etc.), for example, during multi-link operation setup and data packet (e.g. PDUs, SDUs, etc.) transfers. The physical communications links 112-1, 112-2, 112-3 may be logically defined as including one or more communications channels. In some example embodiments, different links however can be in a same frequency band. For example, two channels on a same 5 GHz band can form multi-links. Thus the links 112-1/2/3 in different channels of the same band are also allowed.

For the discussion that follows, "association" is defined in IEEE 802.11 as a service used to establish a mapping between an access point (AP) or personal basic service set (PBSS) control point (PCP), and a station (STA) and enable STA invocation of the distribution system services (DSSs). 802.11 defines association only as between an AP-device (either single-link AP-device or multi-link AP-device (MLD)) and a non-AP device.

Association also defines basic service set (BSS) identifiers (BSSIDs) (e.g. security, bit rate, etc.) for setting up a data communications link between a-STA/client and an AP. "Reassociation" is defined as when a-STA/client roams away from a first AP and needs to setup a new communications link with a second AP. Here the BSSIDs sent in the reassociation request to the second AP also include a MAC address of the first AP.

Multi-link setup (i.e. association) between the non-AP-MLD 104-1 and the AP-MLD 102 in accordance with IEEE 802.11be employs a signaling exchange process including; a capability for one or more of the communications links 112-1, 112-2, 112-3; and that the AP-MLD 102 will serve as an interface to the distribution system (DS) 106 for the non-AP-MLD 104-1. This process essentially treats the multi-link setup process for the non-AP-MLD 104-1 as similar to an association process for a single-link non-AP-STA.

Multi-link teardown for a non-AP-MLD 104-1 in accordance with IEEE 802.11be includes a signaling exchange that is similar to a disassociation process for a single-link non-AP-STA 120-1.

Before the standardization of IEEE 802.11be there was no multi-link reassociation between the non-AP-MLD 104-1 and the AP-MLD 102. Instead, before IEEE 802.11be discusses a reassociation only for a physical single-link-STA (e.g. non-AP-STA 120-1) for moving a current association of the single-link-STA from a first AP to a second AP. In an Extended Service Set (ESS) with distribution system (DS) 106, the reassociation service informs the DS 106 of the current communications link mapping between the AP and the non-AP-STA as the non-AP-STA moves from one Basic Service Set (BSS) to another BSS within the ESS.

For a general link (GLK) in an IEEE 802.1Q network, a reassociation service informs higher layer services how the communications link is reconfigured, commonly, with which BSS the GLK non-AP-STA is associated. The higher layer services will then destroy, disable, or maintain the existing internal sublayer service SAPs (Service Access Points), create or enable new internal sublayer service SAPs, inform the GLK convergence function of the reconfigured GLK mapping of the internal sublayer service SAP's and inform the network routing protocol of the updated GLK. The GLK AP and GLK non-AP-STA each then establish or maintain a SAP identifier for the reconfigured GLK, for their respective MS-SAPs. Reassociation also enables changing association attributes of an established association while the non-AP-STA remains associated with the same AP-MLD. Reassociation is always initiated by the non-AP-STA. A fast BSS transition facility moves a robust security network association (RSNA) during reassociation. If Fast BSS transition (FT) is not used, an old RSNA is deleted and a new RSNA is constructed.

Now discussed are multi-link association (e.g. setup) and multi-link reassociation (e.g. resetup) between one or more AP-MLDs 102 and one or more non-AP-MLDs 104-1, 104-2, 104-3, each of which may include one or more AP-STAs and/or non-AP-STAs (e.g. non-AP-MLDs 104-1 includes non-AP-STAs 120-1, 120-2, 120-3 for example).

Multi-link association (e.g. setup) is discussed below, following the Multi-link reassociation (e.g. resetup) now to be discussed.

Multi-link (ML) reassociation (i.e. resetup or transition) service is invoked: to move a current multi-link setup of a non-AP-MLD (e.g. 104-1) from a first AP-MLD (e.g. 102) to a second AP-MLD (not shown); and/or to switch a current association of a non-AP-STA (e.g. 120-1) with a single-link AP (not shown) to a multi-link setup with a multi-link AP-MLD (e.g. 102); and/or to switch a current multi-link setup of a non-AP-MLD (e.g. 104-1) with an AP-MLD (e.g. 102) to an association with another single-link or multi-link AP (not shown).

Throughout this specification ML-resetup and ML-transition are used interchangeably and refer to a same service protocol. ML-resetup and ML-transition can include: 1) A non-AP-MLD movement from being associated with one AP-MLD in one ESS (Extended Service Set) to be reassociated with another AP-MLD within the same ESS; 2) A non-AP-MLD movement from being associated with one AP-MLD in one ESS to become a non-AP-STA that is reassociated with an AP within the same ESS; and/or 3) A non-AP-STA movement from being associated with one AP in one ESS to become a non-AP-MLD that is reassociated with an AP-MLD with the same ESS.

A move and switch in some example embodiments different. A move refers to, for example, when a non-AP-STA (e.g. a smartphone) physically moves from one AP coverage area to another AP coverage area. A switch can occur whether or not the-STA moves. For example, if the-STA does not move, a switch may still occur so that the-STA can take advantage of an AP with different attributes (e.g. a higher bandwidth communications link).

Figure 2:
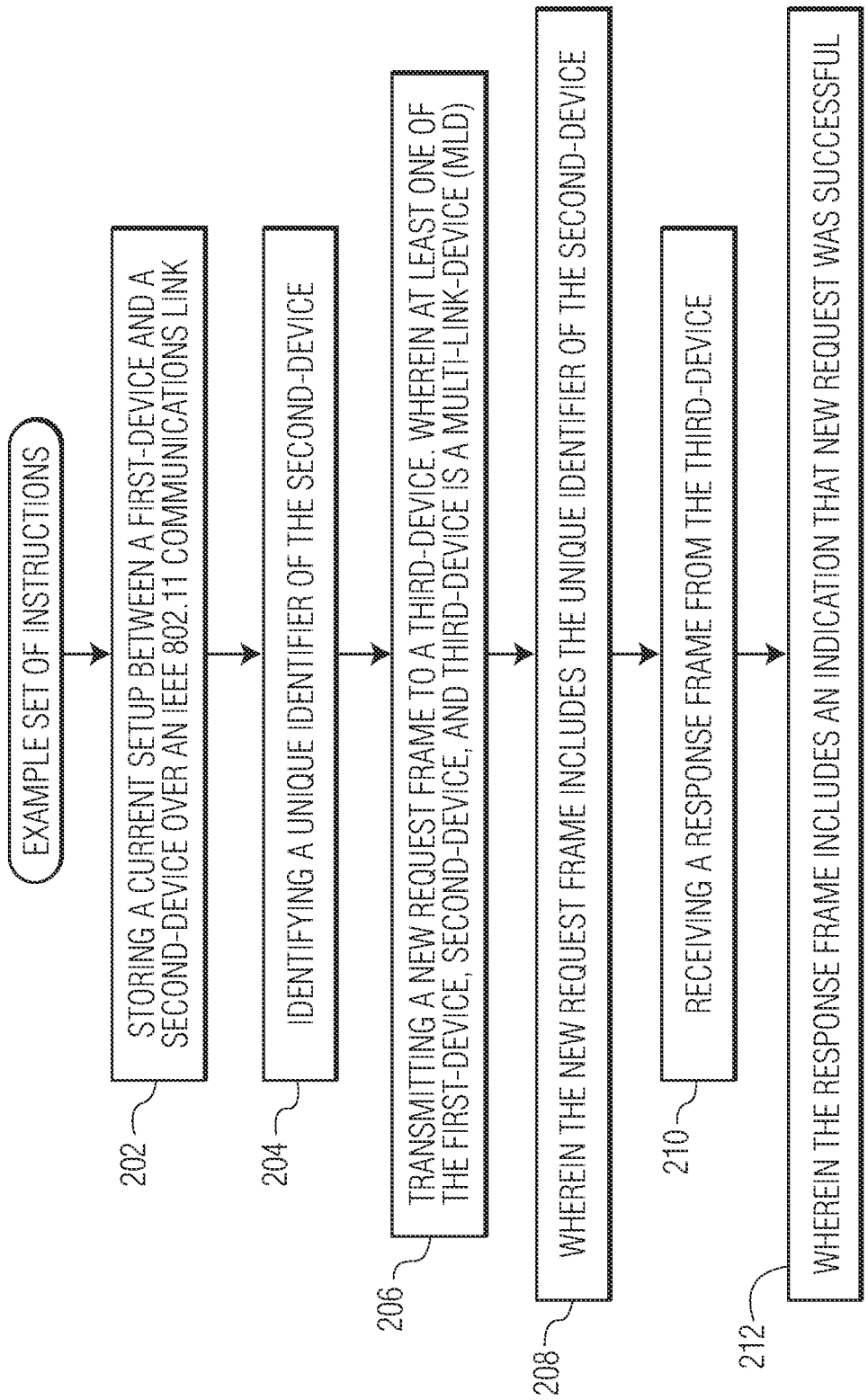
FIG. 2 represents an example set of instructions for reassociating a first-device from a second-device to a third-device within the multi-link communications system.

FIG. 2 represents an example set of instructions for reassociating a first-device (e.g. a non-AP-MLD 104-1) from a second-device (e.g. an AP-MLD 102) to a third-device (e.g. another AP single-link or multi-link device) within the multi-link communications system. Note that the order in which the instructions are discussed does not limit the order in which other example embodiments implement the instructions unless otherwise specifically stated. Additionally, in some embodiments the instructions are implemented in parallel.

A first example instruction set begins in 202 by storing a current multi-link setup between the first-device and a second-device over an IEEE 802.11 communications link. Next, in 204 identifying a unique identifier of the second-device. Then in 206, transmitting a new request frame to a third-device, wherein at least one of the first-device, second-device, and third-device is a multi-link-device (MLD). In 208 the new request frame includes the unique identifier of the second-device. Then in 210 receiving a response frame from the third-device. In 212 the response frame includes an indication that new request was successful.

"Success" and "successful" are herein broadly defined to include at least the following: acceptance of any association or reassociation request; permission for frames to be transmitted and received over one or more communications links, affiliation of one or more non-AP or AP devices (e.g. within a logical non-AP-MLD affiliation or logical AP-MLD affiliation), and one or more single-link or multi-link setups between any non-AP device and AP device.

The instructions in FIG. 2 can be augmented or replaced with additional instructions from the material discussed in the paragraphs to follow.

In some example embodiments, the multi-link reassociation uses only two frame exchanges: a first frame including a reassociation request sent from a non-AP-MLD to a new AP-MLD; and a second frame including a reassociation response sent from the new AP-MLD back to the non-AP-MLD. Note that when a reassociation request is sent to a new AP-MLD, the new AP MLD will send back an acknowledgement frame in response to successful reception of the reassociation request frame. Similarly, when a reassociation response frame is sent to the non-AP MLD, the non-AP MLD will send back an acknowledgement frame in response to successful reception of the reassociation response frame. So, here the "frame exchange" includes a transmission of the frame (either reassociation request or response) and a corresponding acknowledgement frame. Note this two frame exchange does not mean that there are only two frames transmitted, and in some example embodiments there can be at least four frames transmitted.

In some example embodiments, the first frame reuses a conventional (i.e. defined in 802.11) reassociation request frame to which is added: a set of non-AP-MLD capabilities, and an address of a current AP-MLD associated with the non-AP-MLD; and the second frame reuses a conventional reassociation response frame to which a set of capabilities of the new AP-MLD are added. The address of the current AP-MILD can be stored in the single-link frame's "Current AP Address field".

In other example embodiments, the first frame is a new multi-link reassociation request frame to which is added: a set of non-AP-MLD capabilities, and an address of a current AP-MILD associated with the non-AP-MLD; and the second frame is a new multi-link reassociation response frame to which a set of capabilities of the new AP-MLD are added.

The address of the current AP-MLD can be any of the following: a MAC address that identifies a management entity of the current AP-MLD; a unique MAC address (herein defined as a-MLD MAC address or a MAC SAP address) of the current AP-MLD; a MAC address that was identified when the non-AP-MLD successfully created a multi-link association with the current AP-MLD; a MAC address of a specific physical AP that is affiliated with the current logical AP-MLD; or a MAC address of a physical AP that is affiliated with the current AP-MLD and is on a same communications link that the multi-link reassociation frames are transmitted.

The physical AP can be at least one of: any AP that is affiliated with the current AP-MLD; a designated AP that the current AP-MLD indicated when the non-AP-MLD set up the multi-link with the current AP-MLD; an anchor AP whose beacon from the non-AP-MLD monitors; or an AP that is affiliated with the current AP-MLD and is on a same communications link that the reassociation request frame is transmitted.

If a logical non-AP-MLD having a multi-link association with a current AP-MLD intends to switch to a single link association with a physical AP that is logically affiliated with that current AP-MLD, then a physical non-AP-STA that is affiliated with that logical non-AP-MLD transmits a first management frame to the affiliated physical AP.

The first management frame: includes at least the affiliated non-AP-STA's current AP-MLD address; includes an indication that the affiliated non-AP-STA intends to now associate with the physical AP that is logically affiliated with that current AP-MLD; includes the non-AP-MLD's multi-link capabilities and (ii) an additional indication that the non-AP-STA affiliated with the non-AP-MLD 104-1 only intends to associate with that physical AP on a preselected communications link; excludes the non-AP-MLD's multi-link capabilities on communications links other than the preselected communications link; disables all links with the non-AP-MLD other than the preselected communications link; and/or indicates that the non-AP-MLD requests the AP-MLD to not enable other communications links.

In response to the reception of the first management frame, the physical AP that is logically affiliated with the current AP-MLD transmits a second management frame to the non-AP-STA The second management frame: includes an indication that the non-AP-STA is now associated with the AP on the preselected communications link (e.g. a status code field in the second management frame indicates if the association is successfully made and also indicates if the association is for single-link or multi-link association).

In some example embodiments the first management frame is a reassociation request frame (e.g. a reused conventional reassociation request/response frame as defined in 802.11), while in other example embodiments can be a new frame such as multi-link resetup request frame. In some example embodiments the second management frame can be called a reassociation response frame, while in other example embodiments can be a new frame such as multi-link resetup response frame. The above mentioned solutions can also be used when a multi-link capable-STA associates with an AP-MLD 102 as a single link association using a pair of association request and response frames.

After multi-link reassociation is successfully completed, the new AP-MLD serves as an interface to the distribution system (DS) 106 for the non-AP-MLD.

FIG. 3 shows Table 1 representing an example set of reused reassociation frames for BSS switching within the multi-link communications system, and Table 2 representing an example set of new reassociation frames for BSS switching within the multi-link communications system.

FIG. 4 shows Table 3 representing an example set of reused reassociation frames for non-AP-STA Reassociation (e.g. ReSetup) within the multi-link communications system, and Table 4 representing an example set of new reassociation frames for non-AP-STA Reassociation (e.g. ReSetup) within the multi-link communications system.

Multi-link association (e.g. setup) according to IEEE 802.11 requires that when a single communications link (e.g. 112-1) is enabled between a non-AP-STA (e.g. 120-1) and an AP-MLD (e.g. 102), then the non-AP-STA shall neither be prioritized nor de-prioritized compared to any other singlelink-STAs associated with any of the APs (e.g. 110-1, 110-2, 110-3) affiliated with the AP-MLD 102 on that communications link (e.g. 112-1), in terms of medium access (e.g. EDCA (Enhanced Distributed Channel Access) traffic categorization parameters, quality of service (QoS) parameters, and so on.

Now discussed is extending the above requirements to when a non-AP-MLD 104-1 intends to associate with an AP-MLD 102. To begin this association (i.e. setup) the non-AP-MLD 104-1 sends a first frame to the AP-MLD 102 requesting a multi-link association. The first frame includes information on the non-AP-MLD 104-1's multi-link capabilities. The first frame may be a conventional association request frame with additional information element added to support newer features such as multi-link capabilities. Alternatively, the first frame may be a new frame that is used for multi-link setup request.

From the AP-MLD's 102 perspective, if there's only one communications link that matches with the non-AP-MLD 104-1, then the AP-MLD 102 may respond to the first frame by sending back a second frame. The second frame can be an Association Response frame, in which case a non-AP-STA (e.g. 120-1) that is affiliated with the non-AP-MLD 104-1 on the link is now successfully associated with an AP (e.g. 110-1) that is affiliated with the AP-MLD 102.

The second frame confirms a multi-link setup, in which case a multi-link setup is made between the non-AP-MLD 104-1 and the AP-MLD 102. The second frame may reuse an association response frame with addition information element added to support newer features such as multi-link capabilities, or may be a new frame that is used for multi-link setup response.

FIG. 5 shows Table 5 representing an example set of reused association request/response frames for non-AP-STA Association (i.e. Setup) within the multi-link communications system.

As part of this multi-link setup: the non-AP-STA's MAC address can be used as a security key, block ack setup, etc.; a unique MAC address of the non-AP-MLD 104-1 can be used for security key, block ack setup, etc.; or the Association Response frame can include an indication (e.g. in the status code field) that the current association is a single-link association or a multi-link setup with only one link.

If for the multi-link setup, there's only one link enabled on the link, then the non-AP-MLD 104-1's-MLD MAC Address can be used for security key, block ack setup, etc.; or the status code field in the second frame may indicate if the second frame confirms a single link association or a multi-link setup.

In case association request/response frames are used on a first link for a multi-link setup between a non-AP-MLD 104-1 and an AP-MLD 102, then the MAC address of a-STA on the first link affiliated with the non-AP-MLD 104-1 can be used in block acknowledgement setup/agreement if the maximum number of links that can be enabled under the multi-link setup. This would mean that this multi-link setup is considered to be a single-link association.

For multi-link association on other communications links, the non-AP-MLD 104-1 sends a first frame on a first link that requests a multi-link association with the AP-MLD 102, wherein the first frame includes information on the non-AP-MLD 104-1's multi-link capabilities. The first frame may be a conventional Association Request frame with additional information element added to support newer features such as multi-link capabilities. Alternatively, the first frame may be a new frame that is used for multi-link setup request.

From the AP-MLD 102's perspective, if the AP-MLD 102 allows multi-link association with the non-AP-MLD 104-1 on a group of communications links, wherein the group of communications links does not include the first link, then the AP-MLD 102 may respond to the first frame by sending back a second frame on the first link. The second frame indicates (e.g. using a statuscode field) that the AP-MLD 102 does not accept the multi-link association request. The AP-MLD 102 may include an indication that the AP-MLD 102 does not accept the multi-link association request because the AP-MLD 102 does not enable the first link for the non-AP-MLD 104-1. Then, the non-AP-MLD 104-1 may send a third frame on a second link that request an multi-link association with the AP-MLD 102, wherein the group of links includes the second link.

Alternatively the second frame could indicate that the AP-MLD 102 accepts the multi-link association request, but the AP-MLD 102 disables the first link at the time of the multi-link association.

In another example embodiment, the second frame indicates that the AP-MLD 102 accepts the multi-link association request with conditions, wherein the conditions comprises that the AP-MLD 102 cannot map any Traffic Identifier (TID) of the non-AP-MLD 104-1 to the first link. If the non-AP-MLD 104-1 agrees with the conditions, the non-AP-MLD 104-1 sends a fourth frame on the first link that accepts the multi-link association subject to these conditions.

Traffic Identifiers (TIDs) in IEEE 802.11 specify a set of data traffic categories (e.g. priority port, voice, video, etc.) which can be used to prioritize and/or reduce latency of category specific frames transported within a communications channel over a communications link. For example, frames labeled as high priority and/or low latency can be sent over a communications link with a greater bandwidth and/or less delay.

Now discussed are techniques for adapting multi-link association and reassociation processes to Traffic Identifier (TID) to communications link mapping. In terms of mapping, there is default mapping and specific TID-to-link mapping. Default mapping can be done even without any message exchange but specific-TID-to-link mapping requires one or more frame exchanges between a non-AP MLD and an AP MLD. So, if the specific TID-to-link mapping is included during the association process, that implies that association request/response needs to be exchanged multiple times as specific TID-to-link mapping requires one or more frame exchanges. And, this makes association process longer. Thus during the association process, only default mapping is allowed and there's no specific TID-to-link mapping involved. And, the specific TID-to-link mapping can happen after the association is made, and using separate frames. In one example embodiment, the default mapping is that all TIDs are mapped to all the active links that are setup between the AP MLD and the non-AP MLD.

Figure 6:
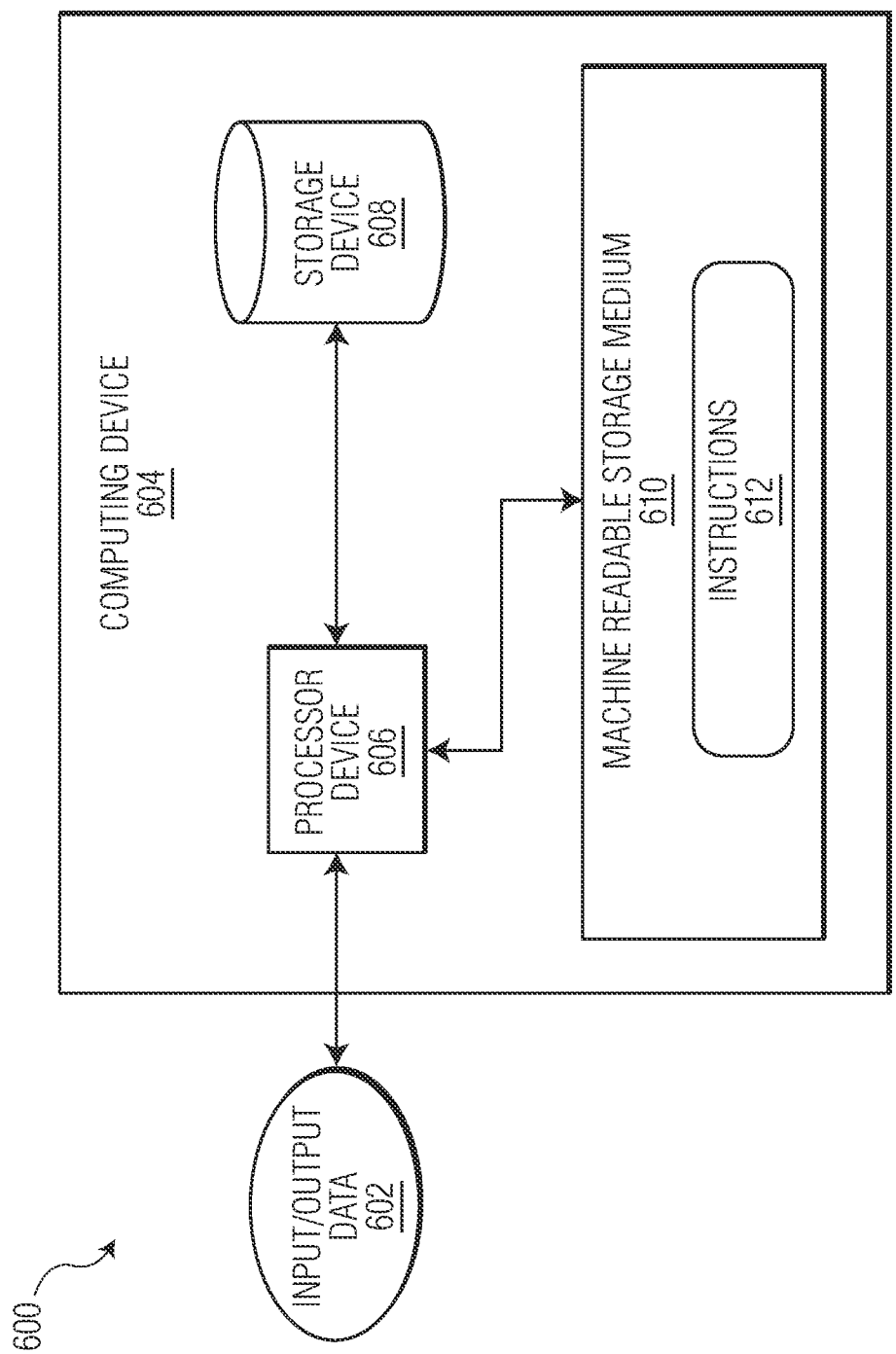
FIG. 6 represents an example system for hosting instructions for enabling the multi-link communications system.

FIG. 6 represents an example system 600 for hosting instructions for enabling the multi-link communications system. Example instructions are shown in FIG. 2, and further instructions are discussed throughout this specification. The system 600 shows an input/output data 602 interface with an electronic apparatus 604. The electronic apparatus 604 includes a processor 606, a storage device 608, and a non-transitory machine-readable storage medium 610. The machine-readable storage medium 610 includes instructions 612 which control how the processor 606 receives input data 602 and transforms the input data into output data 602, using data within the storage device 608. Example instructions 612 stored in the machine-readable storage medium 610 are discussed elsewhere in this specification. The machine-readable storage medium in an alternate example embodiment is a non-transitory computer-readable storage medium.

The processor (such as a central processing unit, CPU, microprocessor, application-specific integrated circuit (ASIC), etc.) controls the overall operation of the storage device (such as random access memory (RAM) for temporary data storage, read only memory (ROM) for permanent data storage, firmware, flash memory, external and internal hard-disk drives, and the like). The processor device communicates with the storage device and non-transitory machine-readable storage medium using a bus and performs operations and tasks that implement one or more instructions stored in the machine-readable storage medium. The machine-readable storage medium in an alternate example embodiment is a computer-readable storage medium.

The instructions in the above Figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions described above are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. A first-device, comprising:
   wherein the first-device is configured to be currently associated with and coupled to a second-device over a wireless communications link; and
   wherein the first-device is configured to,
      store a current association setup between the first-device and the second-device;
      identify a unique identifier of the second-device;
      transmit a reassociation request frame to a third-device;
      wherein at least one of the second-device and third-device is an AP multi-link-device (AP-MLD);
      wherein the reassociation request frame is configured to request a new association with the third-device and includes the unique identifier of the second-device;
      receive a response frame from the third-device; and
      wherein the response frame includes an indication that request was successful.

2. The device of claim 1:
   wherein the first-device is a non-AP MLD;
   wherein the second-device is single-link AP; and
   wherein the third-device is an AP-MLD and the request is for a new multi-link setup with the third-device.

3. The device of claim 1:
   wherein the first-device is a non-AP-STA;
   wherein the second-device is an AP-MLD; and
   wherein the third-device is a single-link-AP and the request is for a new single-link setup with the third-device.

4. The device of claim 1:
   wherein the first-device is a non-AP MLD;
   wherein the second-device is an AP-MLD; and
   wherein the third-device is an AP-MLD.

5. The device of claim 1:
   wherein the unique identifier of the second-device is an MLD MAC address of the second-device if the second-device is an AP-MLD.

6. The device of claim 5:
   wherein the unique identifier of the second-device is indicated by a current AP address field in the reassociation request frame.

7. The device of claim 5:
   wherein the MLD MAC address of the second-device identifies an MLD management entity of the second-device.

8. The device of claim 1:
   wherein the second-device is an AP-MLD and a set of single-link APs are affiliated with the second-device; and
   wherein the unique identifier of the second-device is a MAC address of at least one of the single-link-APs.

9. The device of claim 1:
   wherein the reassociation request frame is based on a move of the first-device from the second-device to the third-device.

10. The device of claim 9:
    wherein the second-device and the third-device are AP-MLDs; and
    wherein the first-device physically moves from an AP-MLD coverage area of the second-device to an AP-MLD coverage area of the third-device.

11. The device of claim 1:
    wherein the reassociation request frame is based on a switch of a setup between the first-device and the second-device; and
    wherein the third-device is an AP within the second-device.

12. The device of claim 1:
wherein the reassociation request frame is based on a switch of a setup from the first-device and the second-device to the first-device and the third-device.

13. The device of claim 1:
wherein the response frame includes an indication whether a single-link association or a multi-link association has been setup based on the reassociation request frame.

14. The device of claim 13:
wherein the single-link association or multi-link association indication is embedded in a status code field within the response frame.

15. The device of claim 1:
wherein, except for the unique identifier, the reassociation request frame is same as a reassociation request frame between a non-AP single-link device and an AP single-link device.

16. The device of claim 1:
wherein the first-device is a logical non-AP-MLD with which a set of physical non-AP-STAs (stations) are affiliated;
wherein the second-device is a logical AP-MLD with which a set of physical APs are affiliated and having a set of communications links;
wherein the first-device is configured to have a current multi-link association with the second-device;
wherein at least one of the non-AP-STAs is configured to transmit the reassociation request frame to the second-device requesting a new single-link association with one of the physical APs affiliated with the second-device; and
wherein the reassociation request frame,
includes a unique identifier identifying an address of the second-device with which the non-AP-STA is currently linked to; and
includes an indication that the non-AP-STA intends to now associate with just one of the physical APs that are affiliated with the second-device on a preselected communications link within the set of communications links.

17. The device of claim 16:
wherein the first-device is configured to receive the response frame from the second-device that includes an indication in a status code field that the non-AP-STA is now associated with the one of the physical APs on the preselected communications link.

18. The device of claim 1:
wherein after receiving the response frame from the third-device, a default TID-to-link mapping is applied between the first-device and the third-device.

19. The device of claim 18:
wherein the first-device is a non-AP-MLD, the second-device is a first-AP-MLD, and the third-device is a second-AP-MLD; and
wherein the first-device is further configured to,
receive a request frame from the third-device that requests a specific Traffic Identifier (TID)-to-link mapping; and
transmit a response frame to the third-device to indicate that the requested TID-to-link mapping is accepted.

20. The method of claim 19:
further comprising transmitting the instructions over a communications medium.

21. The device of claim 18:
wherein the third-device is an AP-MLD including an affiliated set of communications links; and
wherein all of the affiliated communications links have been mapped to the TID by default.

22. The device of claim 1:
wherein after the first-device receives the response frame, the first-device is configured to transmit an additional wireless Traffic Identifier (TID) frame announcing a set of TID requirements; and
wherein the first-device is configured to receive an additional TID to communications link mapping frame from the third-device acknowledging that the set of TID requirements have been successfully implemented.

23. The device of claim 1:
wherein the second-device and the third-device are AP-MLDs;
wherein the first-device transmits the reassociation request frame to the third-device when the first-device physically moves away from the second-device and requests a new communications link setup with the third-device; and
wherein the reassociation request frame to the third-device includes a MAC address of the second-device.

24. The device of claim 1:
wherein the first-device is a non-AP-STA affiliated with a non-AP-MLD;
wherein the second-device and the third-device are AP-MLDs;
wherein the first-device non-AP-STA requests reassociation with just one physical AP in the third-device AP-MLD on a preselected single communications link, and then at least one of,
excludes the non-AP-MLD's multi-link capabilities on communications links other than the preselected single communications link;
disables all links with the non-AP-MLD other than the preselected single communications link; and/or
instructs the non-AP-MLD to request that the third-device AP-MLD not enable other communications links.

25. A method of distributing instructions, stored on a non-transitory, tangible computer readable storage medium, for configuring first-device, wherein the instructions include:
storing a current association setup between the first-device and a second-device over a wireless communications link;
identifying a unique identifier of the second-device;
transmitting a reassociation request frame to a third-device;
wherein at least one of the second-device and third-device is an AP multi-link-device (AP-MLD);
wherein the reassociation request frame is configured to request a new association with the third-device and includes the unique identifier of the second-device; and
receiving a response frame from the third-device;
wherein the response frame includes an indication that the request was successful.

26. A first-AP-MLD (multi-link-device) for wireless communication, comprising:
wherein the first-AP-MLD is configured to receive a reassociation request frame from a non-AP-MLD;
wherein the non-AP-MLD has previously stored,
a current association setup with a second-AP-MLD; and
a unique identifier of the second-AP-MLD;

wherein the reassociation request frame was configured to request a new association with the first-AP-MLD and includes the unique identifier of the second-AP-MLD;
transmit a response frame from the first-AP-MLD to the non-AP-MLD; and
wherein the response frame includes an indication that request was successful.

27. The device of claim 26:
wherein the unique identifier of the second-AP-MLD is an MLD MAC address of the second-AP-MLD.

28. The device of claim 26:
wherein the unique identifier of the second-AP-MLD is indicated by a current AP address field in the reassociation request frame.

* * * * *